United States Patent

[11] 3,589,748

| [72] | Inventor | Milo E. Miller |
| | | 1016 S. 14th St., Goshen, Ind. 46526 |
| [21] | Appl. No. | 848,848 |
| [22] | Filed | Sept. 11, 1969 |
| [45] | Patented | June 29, 1971 |

[54] STABILIZING APPARATUS FOR A TRAILER OR LIKE VEHICLE
9 Claims, 10 Drawing Figs.

[52] U.S. Cl.................................................... 280/150.5,
254/86
[51] Int. Cl....................................................... B60s 9/10
[50] Field of Search............................................ 280/150 A,
150 C, 150 D, 150.5, 43.19, 43.23; 254/86

[56] References Cited
UNITED STATES PATENTS

| 1,313,087 | 8/1919 | Hartwick...................... | 254/86 |
| 2,229,653 | 1/1941 | Hohl............................. | 280/150.5 |
| 2,240,430 | 4/1941 | Willard......................... | 254/86 |
| 2,736,568 | 2/1956 | Martin.......................... | 280/43.19 |
| 2,774,606 | 12/1956 | Burweger et al............... | 280/150.5 |

FOREIGN PATENTS

| 440,528 | 10/1948 | Italy ............................. | 254/86 |

Primary Examiner—Kenneth H. Betts
Assistant Examiner—Winston H. Douglas
Attorney—Oltsch & Knoblock ABSTRACT: Apparatus mountable to the frame of a trailer or a like vehicle for stabilizing and leveling the trailer when parked. The stabilizing and leveling apparatus includes a pair of jacks, each having a housing part and a power-actuated pod which projects from one end of the housing part and which is shiftable between a ground-engaging extended position and a retracted position. The jacks are adapted for mounting on opposite sides of the trailer frame, with each jack having its housing part pivotally connected to the trailer frame so as to be swingable between stored and operative positions. Cable means are provided for causing movement of the jacks between stored and operative positions. An actuator adapted for mounting to the trailer at a convenient and accessible location is provided and includes parts connected to the cable means which, upon actuation, cause a shifting of the cable means and the movement of the jacks between stored and operative positions. The actuator also includes power delivery means, such as a hydraulic pump, operatively connected to each jack to cause extension of the jack pod when the jack is in its operative position and to cause retraction of the pod in preparation to place the jack in its stored position.

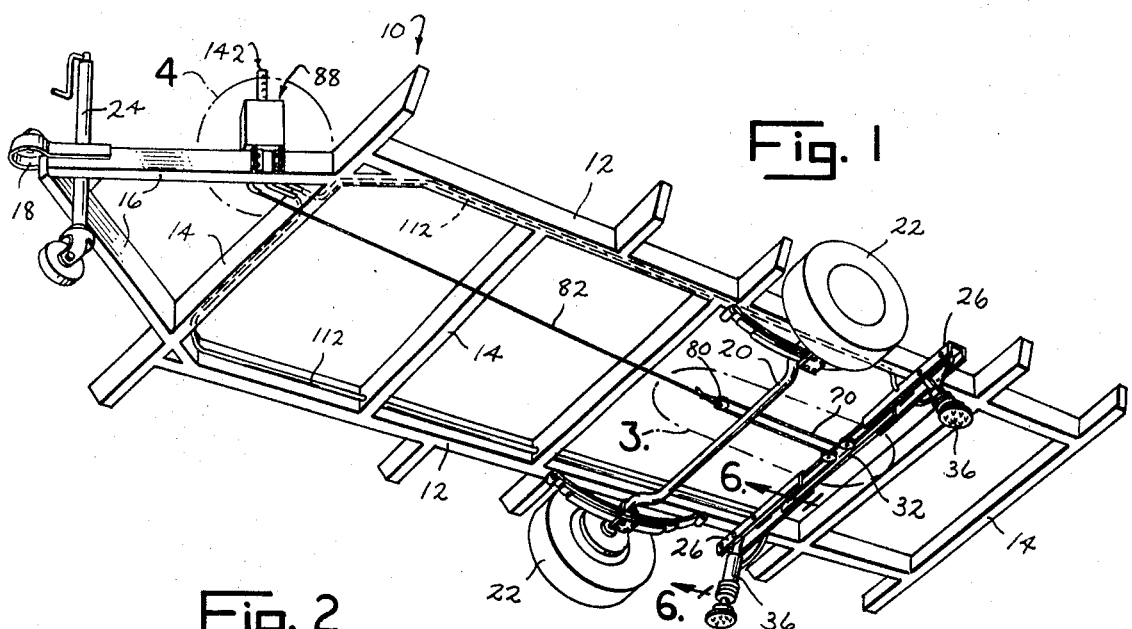
Fig. 1
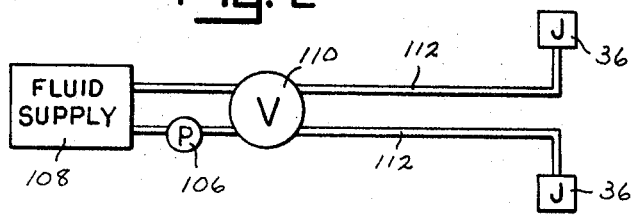
Fig. 2
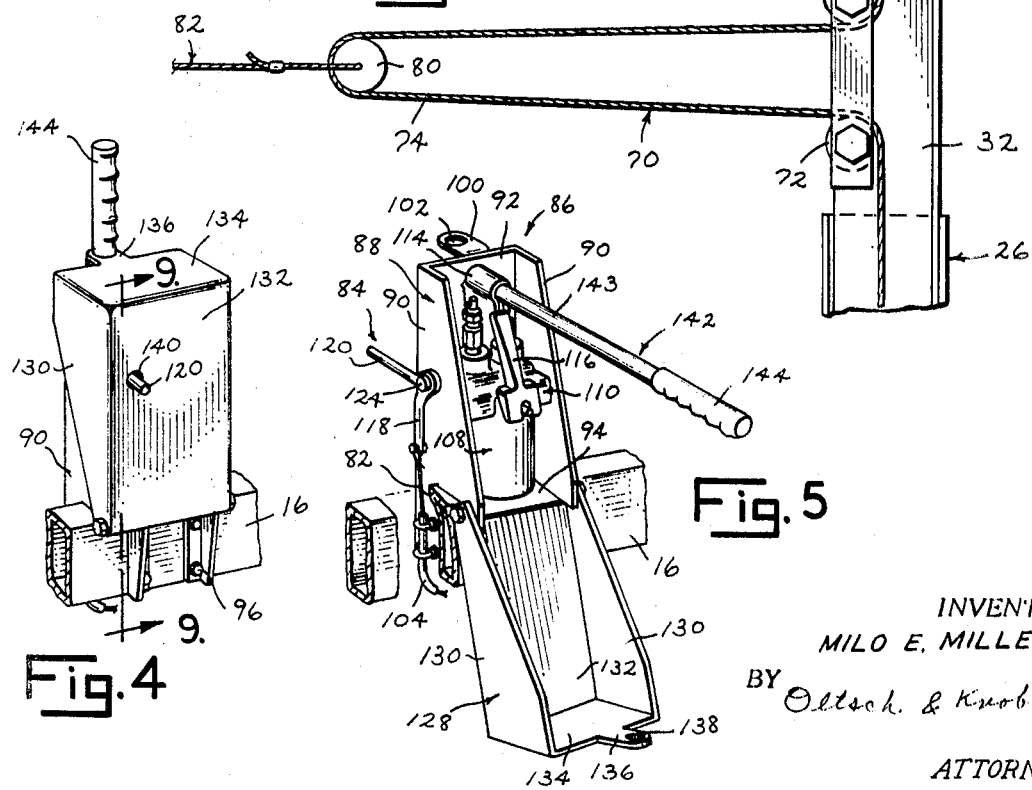
Fig. 3
Fig. 4
Fig. 5
INVENTOR.
MILO E. MILLER
BY Oltsch & Knoblock
ATTORNEYS

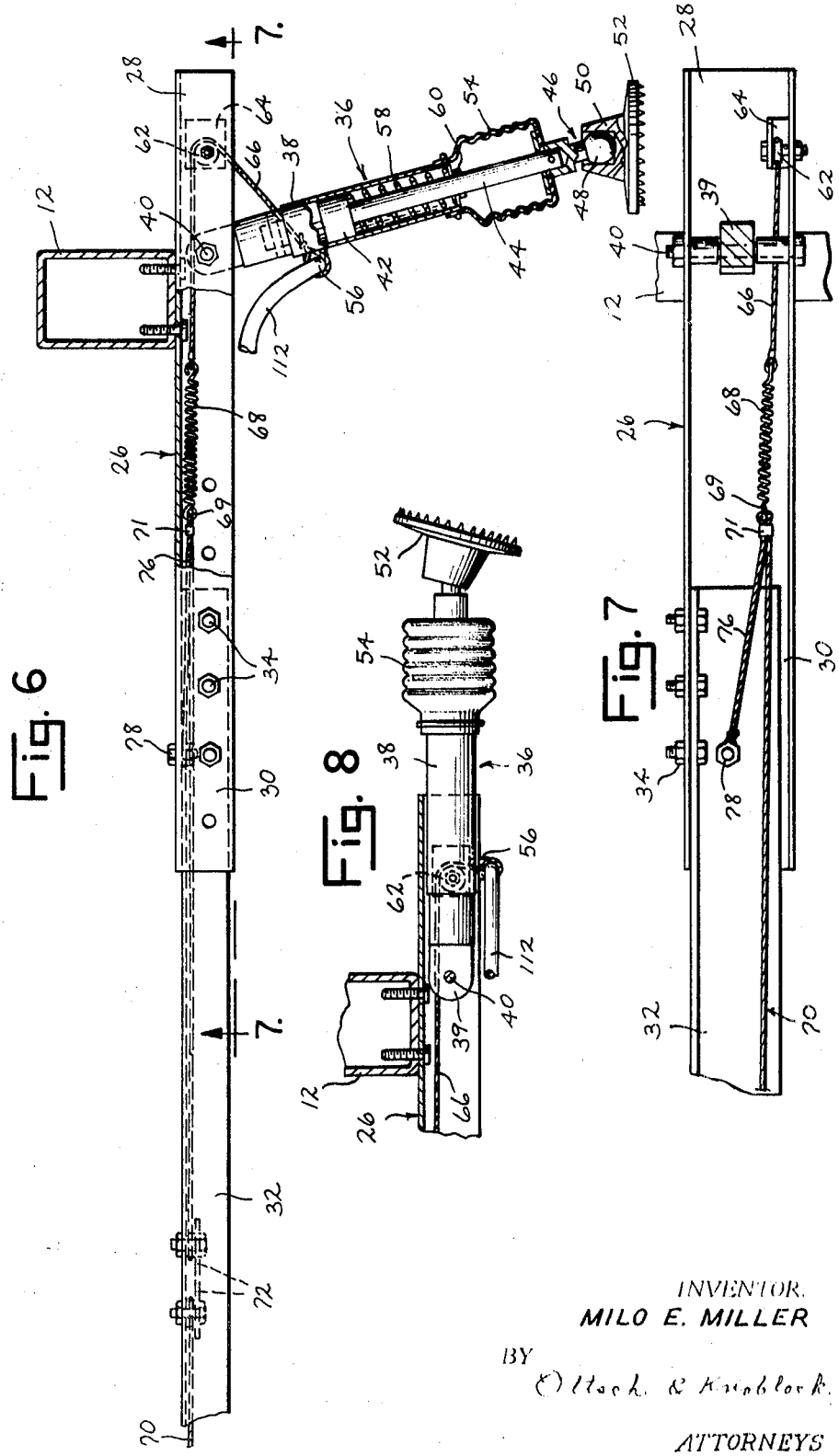

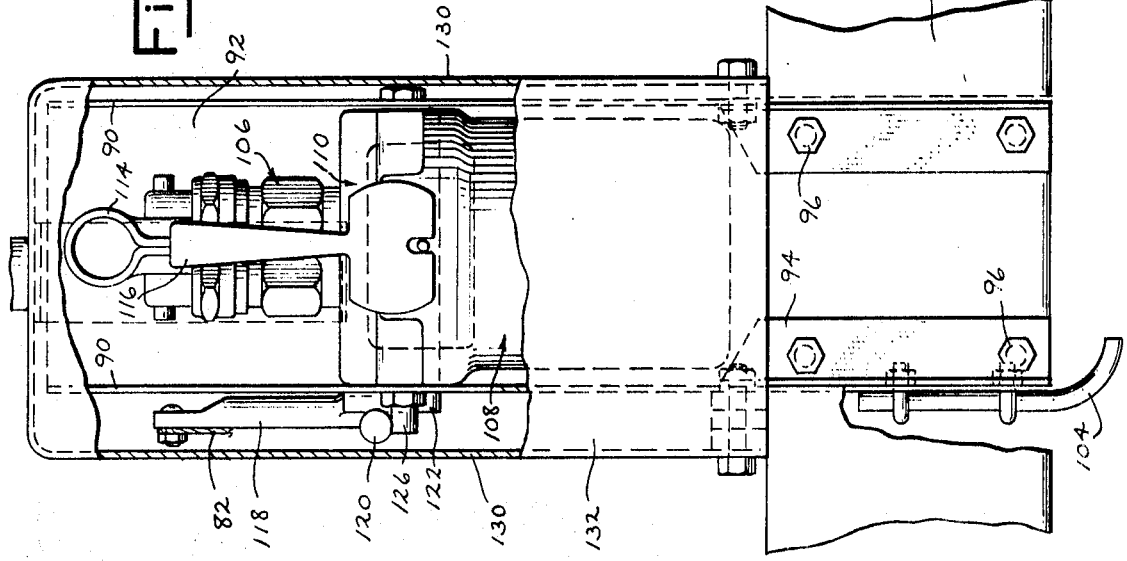
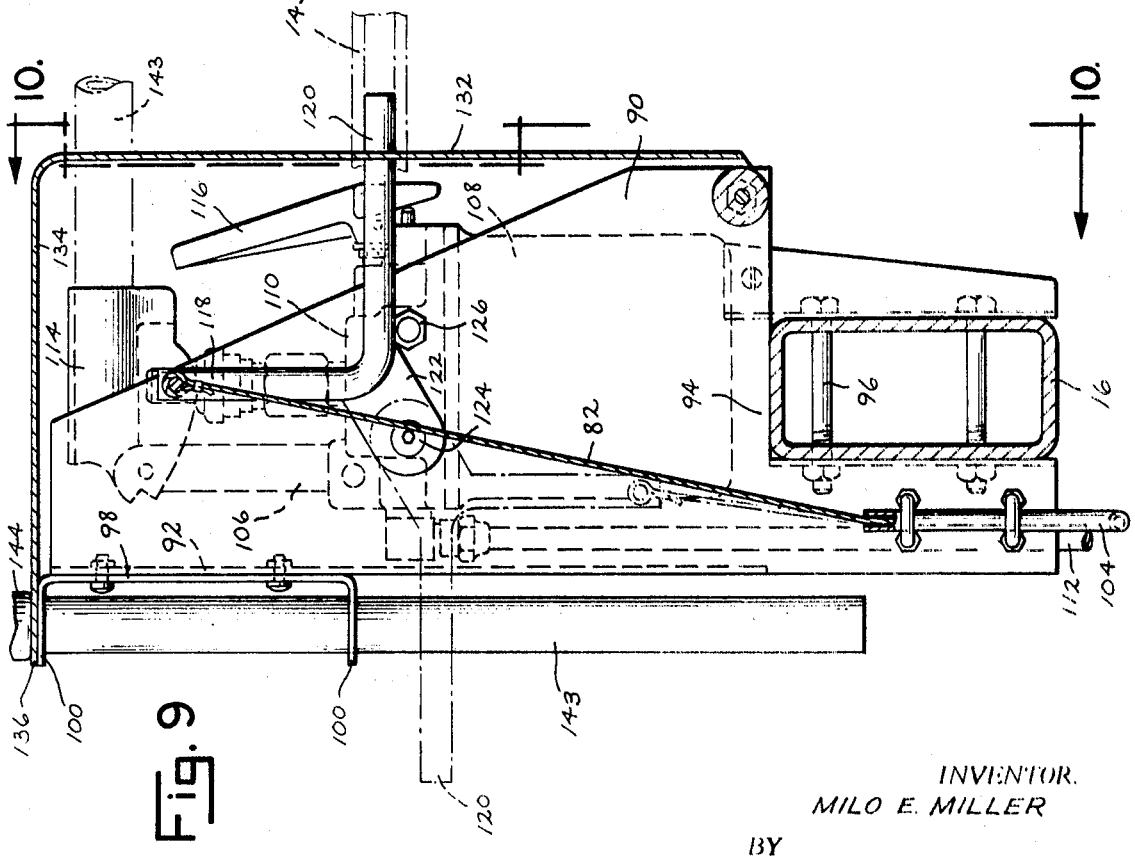

STABILIZING APPARATUS FOR A TRAILER OR LIKE VEHICLE

SUMMARY OF THE INVENTION

This invention relates to apparatus which is mountable to frame of a trailer or similar vehicle and which is utilized to stabilize and level the trailer when parked.

The stabilizing and leveling apparatus of this invention includes a pair of jacks, each having a housing part and a power-actuated pod which projects from one end of said housing part and which is shiftable between a ground-engaging extended position and a retracted position. The jacks are adapted for attachment to opposite sides of the trailer with each jack having its housing part pivotally connected to the trailer frame so as to be swingable between stored and operative positions. Flexible connector means, such as wire cable, engages each jack at a location spaced from its pivot connection to the frame and extends around suitable guide means. An actuator adapted for mounting to the trailer at an accessible location thereon is provided and includes operable parts which are connected to the flexible connector means and which upon actuation cause a shifting of the connector means and resulting movement of each jack between stored and operative positions. The actuator also includes a jack-actuating means operatively connected to the jacks to cause extension and ground engagement of the jack pods when the jacks are placed in their operative positions and to further cause retraction of the pods in preparation for shifting the jacks into their stored positions.

Through the operation of the jack-actuating means, which preferably includes a hydraulic pump in association with a spring return on the piston assembly of each jack, the trailer may be stabilized and, if desired, leveled so as to allow, as in the case of mobile homes, for the proper functioning and use of such household apparatus as refrigerators and stoves. The movement of the jacks from stored and operative positions and the extension and retraction of the jack pods are centrally controlled through the actuator which is attached to the trailer at a location which is easily accessible to the trailer user. At no time is it necessary to handset the jacks in preparation for the stabilizing operation. All controls for utilizing the stabilizing and leveling apparatus are contained in a control box uniquely designed with a hinged cover which incorporates a means for locking the jacks in their stored positions when the cover is closed.

It is an object of this invention to provide means mountable to a trailer or similar vehicle and which includes pivotal jack assemblies mounted at opposite sides of the trailer and engageable with the ground for stabilizing and leveling the trailer.

Another object of this invention is to provide stabilizing and leveling apparatus which is mountable to a trailer or similar vehicle and which is actuatable through a convenient trailer-mounted control box.

Another object of this invention is to provide apparatus mountable to the frame of a trailer or similar vehicle and which includes jack assemblies pivotable relative to the frame between stored and operative positions and actuator means remotely positioned from the jack assemblies for causing said jack assemblies to be pivoted between said operative and stored positions and to be extended when in said operative positions so as to engage the ground and produce a trailer-stabilizing effect.

Other objects of the invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of a trailer frame as seen from below having the stabilizing apparatus of this invention mounted thereto and shown in operative position.

FIG. 2 is a schematic view of the hydraulic control system of this invention.

FIG. 3 is an enlarged fragmentary view of that portion of the stabilizer apparatus which is encircled by broken line 3 in FIG. 1.

FIG. 4 is an enlarged fragmentary view of that portion of the stabilizing apparatus which is enclosed by broken line 4 in FIG. 1.

FIG. 5 is a view of the apparatus components illustrated in FIG. 4 showing the cover thereof open and the parts therein in operative position.

FIG. 6 is a fragmentary view of the stabilizer apparatus as seen along line 6–6 of FIG. 1 with parts thereof removed for purposes of illustration.

FIG. 7 is a fragmentary sectional view taken along line 7–7 of FIG. 6.

FIG. 8 is a fragmentary view of the stabilizer apparatus shown in FIG. 6 with the jack assembly thereof in stored position.

FIG. 9 is a sectional view taken along line 9–9 of FIG. 4.

FIG. 10 is a sectional view taken along line 10–10 of FIG. 9.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The stabilizer apparatus of this invention is illustrated in FIG. 1 as being mounted to a trailer frame 10 having spaced longitudinal supports 12, transverse supports 14, and convergent supports 16 extending forwardly from the forwardmost transverse support 14 of the frame and joined by a coupler 18. Suspension spring and axle assembly 20 is attached to frame 10 and mounts wheels 22 which are located at the opposite sides of the frame. A tongue jack 24 is preferably attached to coupler 18.

Mounted at each side of trailer frame 10, preferably to the underside of a longitudinal support 12 and just rearwardly of the adjacent wheel 22, is an inverted U-shaped channel member 26. Each channel member 26 is positioned transversely relative to the frame and oppositely of each other and includes an outer end portion 28 which preferably projects laterally outwardly from the frame. Each channel member 26 may be attached to a longitudinal support 12 by welding or by bolting. An angle bar or similar support 32 extends between the inner end portions 30 of each channel member 26 and is connected thereto by means of bolts 34.

A jack assembly 36 is pivotally mounted to each channel member 26, preferably under or just outwardly of the connecting longitudinal support 12. Each jack assembly 36 includes a power delivery means, such as a cylinder part 38 and a piston 42, slidably disposed therein. Cylinder part 38 has a closed end 39 which is disposed with clearance between the sides of a channel member 26 and journaled about a connector pin 40 which extends through member 26 so as to cause the jack assembly to be pivoted about a substantially horizontal axis and in a substantially vertical plane transversely oriented relative to the trailer frame. Piston 42 includes an actuator rod 44 which extends axially from the open end of cylinder 38 and which has attached to the free end thereof a ball and socket connector 46. The ball 48 of connector 46 is preferably rigidly mounted to the free end of actuator rod 44 has a socket part 50 pivotally connected thereto. Socket part 50 preferably includes a disc-shaped pod or foot 52. A flexible bellows 54 surrounds the extended portion of actuator rod 44 and has one end connected to the open end of cylinder 38 and the other end connected to ball part 48 of connector 46 so as to prevent the actuator rod and inner parts of the jack assembly from being contaminated by road dirt during use of the trailer. A fitting 56 for receiving one end of a conduit is mounted to the cylinder 38 above piston 42 and serves as an inlet for the jack actuating fluid. A helical spring 58 surrounds each actuator rod 44 and is disposed within cylinder 38 below piston 42 with one end thereof abutting piston 42 and its opposite end engaging an actuator rod guide means 60 disposed within the cylinder.

A guide pulley 62 is mounted at the outer end portion 28 of each channel member 26. Each guide pulley 62 is preferably positioned within member 26 outwardly of the jack assembly pivot connection and adjacent one side edge thereof by means of a bracket 64, as shown in FIGS. 6 and 7. A wire cable 66 has one end attached to cylinder 38 of each jack assembly 36, preferably about fitting 56, and extends therefrom around the adjacent guide pulley 62 along channel member 26 where its opposite end is attached to a helical spring 68 disposed within the channel member. A pair of laterally spaced guide pulleys 72 are preferably mounted to angle bar 32 in the middle of the trailer frame. A wire cable 70 is connected at each end portion thereof to the opposite end of each spring 68. A bight portion 74 of cable 70 extends between and around guide pulleys 72 and forwardly thereof. Each end portion of cable 70 is preferably looped around the hooked end 69 of spring 68 and secured thereto by a clamp 71. The free end part 76 of each looped cable end portion is attached to a channel member 26 by a bolt 78 and has a selected length, the function of which will be later described. It is to be understood that cable end parts 76 may be of separate construction having the ends thereof connected to springs 68 and bolts 78.

The bight portion 74 of cable 70 is trained about a pulley 80 which is attached to and journaled about one end of a wire cable 82. Cable 82 extends forwardly of trailer frame 10 from pulley 80 and terminates with its other end portion connected to a lever 84 constituting part of an actuator assembly 86 which is mounted to a frame support 16 or at a similar convenient location on the trailer.

Actuator assembly 86 includes a control box defined by a receptacle or housing 88 and a cover 128. Housing 88 includes side panels 90, a back panel 92 and a base 94 which is secured to support 16 by bolts 96 or similar securement means. A bracket 98 is mounted to back panel 92 of housing 88 and includes spaced upper and lower flange parts 100 having aligned apertures 102 (only one shown) therein. A cable guide 104 is attached to a side panel 90 of housing 88 and serves to slidably receive the forward end portion of cable 82 adjacent to the connection of the cable to lever 84. Mounted in housing 88 is a pump 106, a valve 110, and a container or reservoir 108 for the storage of hydraulic fluid. Pump 106 may be of the standard hydraulic type having a pivoted socket mounting 114 which when rocked actuates an internal piston (not shown) and causes fluid within container 108 to pass through valve 110 and conduits 112 which interconnect valve 110 with fittings 56 of the jack assemblies and into jack cylinders 38 causing the extension of actuator rods 44 and the simultaneous compression of springs 58 circled thereabout. Valve 110 includes an actuating handle 116 and is of any of a variety of well-known constructions which upon selected positioning of its handle 116 permits each jack pod 52 of be extended or retracted simultaneously with or independently of the other by regulating the hydraulic fluid flow between pump 106 and the jack assemblies and between the jack assemblies and container 108. Lever 84 to which one end of cable 82 is attached preferably comprises a rigid arm having end parts 118 and 120 extending at substantially a right angle to each other and a lug 122 projecting from the bend or elbow of the arm. Lug 122 is pivotally connected by means of a pin 124 to the outer surface of a side panel 90 of housing 88. One end of cable 82 is connected to the free end of end part 118 so as to be shiftable as lever 84 is pivoted about pin 124. Lever 84 is so constructed and arranged that when end part 118 extends substantially vertically upwardly with the attached end of cable 82 pulled upwardly and positioned forwardly relative to the housing over the axis of pin 124, end part 120 of the lever is positioned substantially horizontally and projects forwardly of housing 88 resting upon a stop 126 attached to side panel 90, as illustrated in the solid lines of FIG. 9. A cover 128 having side panels 130, a front panel 132, and a top panel 134 is pivotally connected to housing 88 at the lower front edge thereof. Cover 128 is adapted to enclose the open top and front of housing 88 overlapping with clearance lever 84 pivotally mounted to the outer surface of a side panel 90 of housing 88. Top panel 134 of cover 128 includes a flange part 136 which has an aperture 138 therein and which, when the cover is closed, engages upper flange part 100 of bracket 98 attached to housing 88 with cover aperture 138 and aperture 102 in the engaging flange part in registry. Front panel 132 of cover 128 has an opening 140 formed therein which, when the cover is closed, receives projecting end part 120 of lever 84 thereby preventing pivotal movement of lever 84 about pin 124. An elongated handle 142 is provided for actuating pump 106 and to assist in turning lever 84. Handle 142 has a grip 144 mounted over one end and is preferably of a tubular construction. As illustrated in broken lines in FIG. 9, the other end 143 of handle 142 is adapted to fit within the socket portion of pump mounting 114 to facilitate actuation of the pump and to fit over the extended end part 120 of lever 84 to facilitate turning of the lever. Handle 142 when not in use is inserted through aperture 138 in cover 128 and apertures 102 in bracket 98 mounted to housing 88, as illustrated in solid lines in FIG. 9, with grip 144 engaging bracket 98, thereby serving to lock cover 128 in a closed position and thus preventing lever 84 from being disengaged from opening 140 in the cover.

To operate the stabilizing and leveling apparatus of this invention, the trailer is parked in a selected location and is preferably disconnected from its towing vehicle. The trailer is then preferably leveled fore and aft by actuation of tongue jack 24. It is to be understood, of course, that is is not necessary to disconnect the trailer from the towing vehicle in order to use this invention. Handle 142 is removed from actuator assembly 86 and cover 128 thereof pivoted forwardly relative to the actuator assembly, thereby exposing pump 106 and associated equipment in housing 88 and freeing lever 84 for turning. The open tubular end 143 of handle 142 is positioned over the protruding end part 120 of lever 84 and swung upwardly and rearwardly relative to housing 88 until end part 118 of lever 84 to which cable 82 is attached is pointing vertically downwardly, thus releasing the tension in cable 82. Upon the release of cable 82, jack assemblies 36 simultaneously pivot about pins 40 and shift from their stored positions, as illustrated in FIG. 8, to their operative positions, as best illustrated in FIG. 6. Interconnected cables 66, 70 and 82 are preferably formed of wire and, consequently, have little or no elasticity, thereby making it necessary to insert springs 68 within the cable connection between the actuating assembly and jack assemblies so as to permit some give in the cable connection as lever 84 causes the connected end of cable 82 to be positioned overcenter relative to lever pivot 124. Springs 68 are of sufficient stiffness to firmly hold the jack assemblies in their stored and operative positions. Each jack assembly 36 preferably projects downwardly and outwardly relative to the trailer frame when in its operative position and is so located by end portion 76 of cable 70 which serves as a jack assembly stop means.

Once jack assemblies 36 are in their operative positions, handle 116 of valve 110 is turned to provide fluid communication between pump 106 and cylinder 38 of each jack assembly. Handle 142 is removed from lever 84 and inserted into socket mounting 114 of the pump. Actuation of pump 106 by handle 142 causes the extension of actuator rods 44 and the contact of the pods 52 thereof with the ground. Due to the unevenness of the ground, it may be necessary to adjust valve 110 so as to extend only one actuator rod at a time until all pods engage the ground. By having the jack assemblies outwardly inclined relative to the trailer frame, the contact of the pods with the ground creates opposed upwardly and inwardly directed trailer-stabilizing forces. Additionally, each jack assembly 36 is preferably of sufficient strength to lift a side of the trailer off the ground and thereby cause side-to-side leveling of the trailer, if desired. Once the proper stabilization and leveling, if desired, has been accomplished, handle 116 of valve 110 is moved to closed position, thereby locking the jack assemblies in position.

When it is desired to move the trailer, handle 116 of valve 110 is positioned so as to permit the flow of hydraulic fluid from jack assemblies 36 into container 108. First the weight of the trailer and then the action of springs 58 in the jack assemblies cause actuator rods 44 to retract, thereby disengaging pods 52 from the ground. When each actuator rod 44 is fully retracted, as illustrated in FIG. 8, handle 116 of the valve is closed. Handle 142 is then repositioned over lever end part 120 and the handle swung upwardly and forwardly relative to the actuator assembly from the broken-line position to the solid-line position of FIG. 9, thereby causing cables 82, 70 and 66 to swing each jack assembly from its operative position as shown in FIG. 6 to its stored position as shown in FIG. 8. Handle 142 is removed from lever 84 and cover 128 closed. The handle 142 is then reinserted through aperture 138 and apertures 102 in the cover and housing parts respectively of the actuator assembly, thereby locking the cover and lever 84 in position.

Jack assemblies 36 are so positioned relative to longitudinal supports 12 of trailer frame 10 that, when in their stored positions, pods 52 thereof are preferably located inwardly of the outline of the sides of the trailer.

What I claim is:

1. Apparatus mountable to the frame of a trailer or a like vehicle for stabilizing said trailer when parked comprising:

A pair of jacks each having a housing part and a ground-engageable foot part projecting from one end of said housing part and shiftable between extended and retracted positions relative to said housing part;

means for positioning said jacks at opposite sides of said trailer with the housing part of each jack pivotally connected to said trailer frame so as to be swingable between stored and operative positions;

a control box attachable to said trailer; first and second actuator means carried by said control box;

a flexible connector interconnecting said jacks and said first actuator means, said flexible connector being shiftable on operation of said first actuator means to cause pivotal movement of said jacks between stored and operative positions thereof;

each jack including a power delivery means which upon actuation causes the foot part associated therewith to shift between said extended and retracted positions; and said second actuator means being operatively connected to each power delivery means for causing said actuation of said delivery means.

2. The stabilizing apparatus of claim 1 wherein each power delivery means includes a cylinder and a piston having a said foot part connected thereto shiftable within said cylinder, said second actuator means including a hydraulic pump and conduits connecting said pump to said cylinder, said pump upon actuation serving to direct hydraulic fluid contained within said pump into each cylinder for causing shifting of said piston therein.

3. The stabilizing apparatus of claim 1 and including support means adapted to extend transversely of said trailer for connection to said frame adjacent the underside thereof, said support means including inverted U-shaped channel portions adapted for positioning at opposite sides of said trailer, each housing part having its opposite end disposed within a said channel portion between the sidewalls thereof and pivotally connected thereto.

4. The stabilizing apparatus of claim 3 wherein the pivot connection of each housing part is spaced inwardly from the outer margin of said connecting channel portion, guide means connected to each channel portion and located outwardly from the housing part pivot connection thereto, said flexible connector including cables each having one end portion trained over a said guide means and connected to a said housing part at a location thereon spaced from the pivot connection of the housing part.

5. The stabilizing apparatus of claim 4 wherein each jack when shifted into its stored position is received within said connecting channel portion between the sides thereof.

6. The stabilizing apparatus of claim 5 and stop means connected to each channel portion for positioning said connected jack in a downwardly inclined, outwardly directed orientation relative to said frame when said jack is in its operative position.

7. The stabilizing apparatus of claim 1 wherein said jacks are adapted to be oppositely positioned on said trailer with each jack swingable in a substantially vertical plane between said stored position in which the jack is outwardly directed relative to said frame in substantially horizontal orientation and said operative position in which the jack is outwardly directed relative to said frame in a downwardly inclined orientation.

8. The stabilizing apparatus of claim 1 wherein said first actuator means includes a lever pivoted to said control box and having a protruding handle part, said flexible connector being attached to said lever so as to be shiftable upon pivotal movement of said lever by actuation of its handle part, said control box including a cover having an opening therein, said handle part being received within said cover opening and restricted from movement so as to prevent movement of said lever when the jacks are in their stored positions and the cover closed, and means locking said cover closed.

9. The jack apparatus of claim 8 wherein said second actuator means includes an elongated detachable actuating handle, said control box including a receptacle having a panel part with an aperture therein, said cover being hinged to said receptacle and having an aperture therein which registers with the aperture in said receptacle when said cover is closed, said detachable lever being adapted for insertion through said registering apertures to lock said cover closed.